Sept. 2, 1969            G. H. ODOM            3,464,646
LEVEL WINDING MECHANISM FOR FISHING REELS
Filed June 19, 1967            2 Sheets-Sheet 1
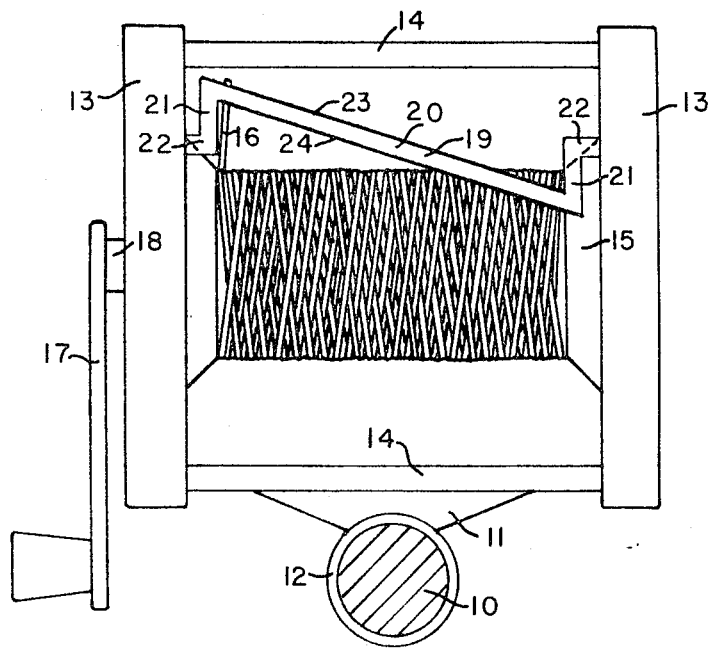
FIGURE 1
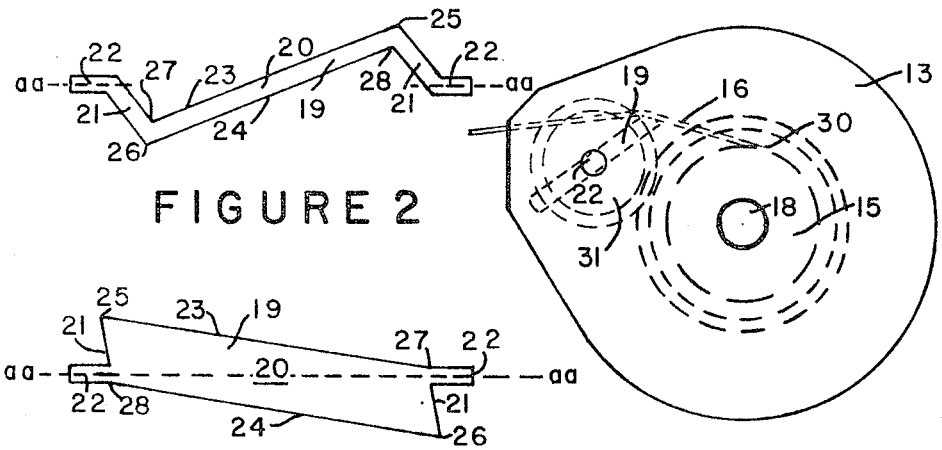
FIGURE 2
FIGURE 3
FIGURE 4
INVENTOR.
GEORGE H. ODOM
BY
*M. N. Choate*
ATTORNEY

United States Patent Office 3,464,646
Patented Sept. 2, 1969

3,464,646
LEVEL WINDING MECHANISM FOR FISHING REELS
George H. Odom, 208 Tuna, Galveston, Tex. 77550
Filed June 19, 1967, Ser. No. 646,976
Int. Cl. A01k *89/04, 89/00;* B65h *57/02*
U.S. Cl. 242—84.41                                       6 Claims

ABSTRACT OF THE DISCLOSURE

A level winding mechanism and a fishing reel having the level winding mechanism as a part thereof, the level winding mechanism comprising a shaft called a traversing element disposed in front of the reel spool and rotationally responsive thereto. The traversing element has two substantially parallel surfaces in diagonal relationship to the axis of rotation of the traversing element, the diagonally opposite ends of the surfaces being substantially equidistant from the axis of rotation.

BACKGROUND OF THE INVENTION

Field of the invention

The present invention relates to fishing reels. More particularly, the present invention relates to a level winding means for evenly distributing fishing line onto the line spool of a fishing reel and to a fishing reel employing such a level winding means.

The prior art

Several means have been suggested for providing an even distribution of fishing line on a fishing reel line spool during rewinding of the fishing line. A common such means includes a line guide reciprocably mounted on a right and left screw threaded traversing shaft. This type of level winding means has been found useful in many instances but suffers several disadvantages. Because of the precision required in the traversing shaft and reciprocating line guide, this type of level wind means is relatively expensive. Further, this type of level winding mechanism is relatively easily fouled by dirt, sand and salt. Additionally, by its nature of operation, the line guide is usually in the form of a loop and must enclose the fishing line on at least opposite sides thereof thus making engagement and disengagement of the fishing line from the level wind mechanism difficult.

Another type of level winding means proposed by the prior art is one which includes a spiral shaft lying parallel to the line spool and over which the fishing line passes on being rewound. Rotation of this spiral shaft results in the fishing line being moved across the shaft and thus, evenly distributed upon the line spool. To move the fishing line back and forth across the spiral shaft, the shaft oscillates in its rotation. Generally, a complete rotation of the spiral shaft moves the fishing line from one end to the other of the shaft and, thus, from one end to the other of the line spool. Therefore, in order to form another layer of line on the spool, the spiral shaft must be rotated in the opposite direction for a substantially complete revolution. Since the line spool must be continuously rotated in a single direction in order to wind line thereon, it is necessary to provide a rather complicated arrangement of gears in order to provide oscillatory rotation to the spiral level wind shaft.

Both of the above discussed level wind means provide for the fishing line to be wound onto the line spool in substantially parallel windings both horizontally and vertically. Thus, if the line is not wound onto the spool tightly, a hard pull on the fishing line may result in the line "cutting" down through one or more of the parallel windings and becoming tightly held between the windings it has "cut" into. This may result in immediate fouling of the line or may not be noticed until a later cast but, in either event, will produce unwanted difficulties in operation.

It is now an object of the present invention to provide a new and novel level winding means and a fishing reel including such level winding means. An additional object of the present invention is to provide a level winding means which is simple and inexpensive and a fishing reel including such level winding means. Another object of the present invention is to provide a level winding means providing for even distribution of the fishing line on the line spool in a manner whereby "cutting" of the line into lower layers of windings thereof is alleviated and to a fishing reel including such level winding means. It is also an object of the present invention to provide a level winding means from which fishing line may be readily disengaged and reengaged therewith and to a fishing reel including such a level winding means. A remaining object of the present invention is to provide a new and novel level winding means which continuously rotates in a single direction and with which the fishing line may be passed over or under in contact therewith and to a fishing reel including such a level winding means. Additional objects will become apparent from the following description of the invention herein disclosed.

SUMMARY OF THE INVENTION

The present invention which fulfills these and other objects, in one of its embodiments, is a level winding means comprising a traversing element having two opposite substantially parallel surfaces in diagonal relationship to the axis of rotation of said traversing element, the diagonally opposite ends of said substantially parallel surfaces being substantially equidistant from said axis of rotation.

In another embodiment, the present invention is a fishing reel providing for level winding comprising a reel frame having a spool rotatably mounted therein and a level winding means rotatably connected to said reel frame and adapted for rotation on an axis substantially parallel to the axis of said spool and rotatably responsive to rotation of said spool, said level winding means comprising a traversing element having two opposite substantially parallel surfaces in diagonal relationship to the axis of rotation of said traversing element, the diagonally opposite ends of said substantially parallel surfaces being substantially equidistant from said axis of rotation.

The use of the above described level winding means is a fishing reel as defined herein results in an even distribution of fishing line on the line spool. However, the line is wound onto the spool in a manner different from that normally accomplished by prior art level winding means. As noted above, the prior art mechanisms arrange the line on the spool in substantially parallel windings, both horizontally and vertically. With the present invention, the line is wound onto the spool in substantially parallel windings horizontally but not vertically. This is to say that each layer of parallel windings on the spool is not in parallel relationship with the windings of the layer above or below. Instead, each layer is in pronounced angular relationship with the windings of the layers above and below. The level wind means of the present invention is very simple in construction and fishing line may be readily and quickly disengaged or engaged therewith. Further, because of the nature of the present level wind means, according to its location in the reel frame, the fishing line may be passed either over or under the level winding means.

DESCRIPTION OF THE DRAWINGS

The accompanying drawings illustrate various embodiments of the present invention and details thereof.

FIGURE 1 is a front elevational view of a level winding fishing reel of the present invention embodying the new and improved level winding means of the present invention as an integral part thereof.

FIGURE 2 is a front elevational view of an embodiment of the traversing element of the level winding means of the present invention.

FIGURE 3 is a front elevational view of another type and embodiment of the level winding means of the present invention.

FIGURE 4 is a side elevational view of a level winding fishing reel embodying the new and improved level winding means of the present invention.

DESCRIPTION OF THE PREFERRED EMBODIMENTS OF THE INVENTION

Figure 5:
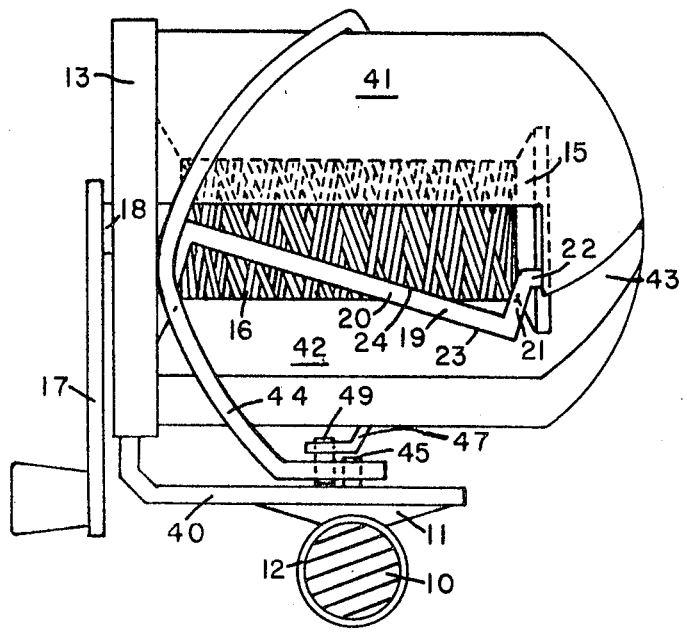
FIGURE 5 is a front elevational view of a particularly useful level winding fishing reel including the level winding means of the present invention and also including means for simply and easily converting the fishing reel from a spinning type reel to a drum type reel and vice versa.

To describe the preferred embodiments of the present invention, reference is made to the accompanying drawings. In the drawings, like characters are used throughout to denote corresponding parts.

In the drawings, a fishing reel is shown mounted on a usual fishing rod 10. The fishing reel is provided with a reel seat plate 11 which is secured in position on fishing rod 10 by a pair of usual ring-type clamping members 12 which fit over the ends of the reel seat plate 11 to secure the fishing reel to fishing rod 10.

The fishing reel comprises a reel frame formed by side plates 13 which are connected and maintained in spaced relationship by a plurality of pillars or connecting bars 14. Within the reel frame, a spool 15 upon which fishing line 16 is wound is disposed between side plates 13. A crank 17 is connected to crank shaft 18 which is operatively connected to spool 15 by direct means or through conventional gearing arrangements such that rotation of crank 17 results in rotation of spool 15.

The fishing reel of the present invention is not to be limited to any particular arrangement of connecting bars or even to the requirement of any connecting bars and, further, is not to be limited to the use of two side plates. As will be hereinafter described with reference to FIGURES 5 and 6, the fishing reel of the present invention may possess only one side plate and may have no connecting bars.

The level winding means of the present invention includes a traversing element 19 which, as shown in FIGURE 1, is spaced between side plates 13 and is adapted for rotation on an axis AA which is substantially parallel to the axis of spool 15. Traversing element 19 comprises a bar 20, end segments 21, and pins 22. The bar 20 may take a number of shapes including cylindrical, oval or flat. In FIGURES 1, 2 and 4 through 6, the bar is represented as having a cylindrical cross section while in FIGURE 3 the bar is represented as substantially flat. Regardless of the shape, however, bar 20 has surfaces 23 and 24 which lie on opposite sides of bar 20 and provide the surfaces over which fishing line 16 moves as it is guided onto spool 15. Lengthwise, these surfaces 23 and 24 are substantially straight and have no obstructions which would interfere with the fishing line sliding along such surfaces. Transversely, these surfaces usually are somewhat rounded. Surfaces 23 and 24 are substantially parallel to one another and are in diagonal relationship to the axis AA of rotation of traversing element 19. This diagonal relationship preferably is such that surfaces 23 and 24 form an angle of less than 45 degrees with the axis AA of traversing element 19.

In order for the level winding means to continuously guide and evenly distribute fishing line 16 onto spool 15 while revolving continuously in a single direction, the diagonally opposite ends of surfaces 23 and 24 are substantially equidistant from axis AA. For example, outer end 25 of surface 23 is substantially the same distance from axis AA as is diagonally opposite outer end 26 of surface 24. Similarly, inner end 27 of surface 23 is substantially the same distance from axis AA as is diagonally opposite inner end 28 of surface 24. To prevent fishing line 16 from traveling off of the end of bar 20 and falling into the space between end segments 21 and side plate 13, outer ends 25 and 26 of surfaces 23 and 24, respectively, must extend beyond the inner ends 27 and 28 of surfaces 23 and 24, respectively. As noted from the above usage, "outer end" refers to the end of either of the surfaces furtherest from the axis of rotation while "inner end" refers to the end of either of the surfaces nearest to the axis of rotation.

Traversing element 19 including bar 20, end segments 21 and pins 22, may take a number of shapes within the definition of the present invention presented herein. FIGURES 1, 2, 3 and 5 all illustrate different shapes of the traversing element. In FIGURES 1, 2 and 5, a cylindrical metal bar has been conformed to a Z-shape to provide traversing element 19. The parallel segments of the Z-shaped metal bar provide the end segments 21 while the middle diagonal portion of the metal bar provides bar 20. Pins 22 are fixedly attached to the end segments 21 of the metal bar and provide for an axis AA of rotation for the traversing element. The traversing elements of FIGURES 1 and 2 differ only with respect to the angle formed by bar 20 and end segments 21 and FIGURE 5 illustrates a traversing element having one end as in FIGURE 1 and one end as in FIGURE 2. Preferably, the traversing element has the form shown in FIGURE 2 wherein the end segments are parallel and form an angle of less than 90 degrees with the axis AA. In FIGURE 3, the traversing element is illustrated as a substantially flat bar having pins 22 affixed to the end segments 21 at diagonally opposite corners.

The position of the traversing element with respect to spool 15 will vary depending upon whether it is desired to bring the fishing line over or under the traversing element. If the line is to be pulled under the traversing element, then the traversing element will be positioned lower in the reel than the spool. The converse is true when the fishing line is to be pulled over the top of the traversing element.

The means whereby the level winding mechanism is made rotationally responsive to rotation of spool 15 may be any of those conventionally employed. Since traversing element 19 may rotate in the same or a different direction to that of spool 15, an arrangement of gears employing any number of gears may be used. In FIGURE 4, an arrangement is shown wherein a drive gear 30 which is fixedly attached to crank shaft 18, meshes with and drives a second gear 31 which is fixedly attached to pin 22 of traversing element 19. As crank 17 is rotated, crank shaft 18 and spool 15 are rotated along with drive gear 30 which drives gear 31 causing traversing element 19 to rotate in the opposite direction to spool 15. Just as readily, a third gear could be inserted between gears 30 and 31 thereby providing for rotation of traversing element 19 in the same direction as spool 15. The gear arrangement most often is such that spool 15 rotates more often than traversing element 19, usually in a ratio of at least 2 revolutions of spool 15 per revolution of traversing element 19. The more revolutions of spool 15 per revolution of traversing element 19, the closer will be the windings of a layer of fishing line 16 on spool 15. Preferably, the number of revolutions of spool 15 per revolution of traversing element 19 is that of a non-whole number to one, i.e., 2.8:1 or 3.2:1 etc.

With rotation of element 19, line 16 moves across opposite surfaces 23 and 24 of bar 20 and is wound onto spool 15 in substantially parallel winding. However, such windings of each layer are in definite angular relation to the windings of layers both above and below. This produces a grid or honeycomb effect as shown in FIGURES 1 and 5.

In a particularly useful embodiment, the level winding means of the present invention is employed as an integral part of a fishing reel which may be readily converted from operation as a drum type reel to operation as a spinning type reel and back. As used herein, "spinning type reel" refers to reels which on casting provide for the line to be stripped off of an end of the spool and in a direction parallel to the axis of the spool. "Drum type reel," as used herein, refers to reels which provide for line to be wound onto the spool by rotation of the spool and in a direction perpendicular to the axis of the spool. To describe this embodiment, particular reference is made to FIGURES 5 and 6.

Figure 6:
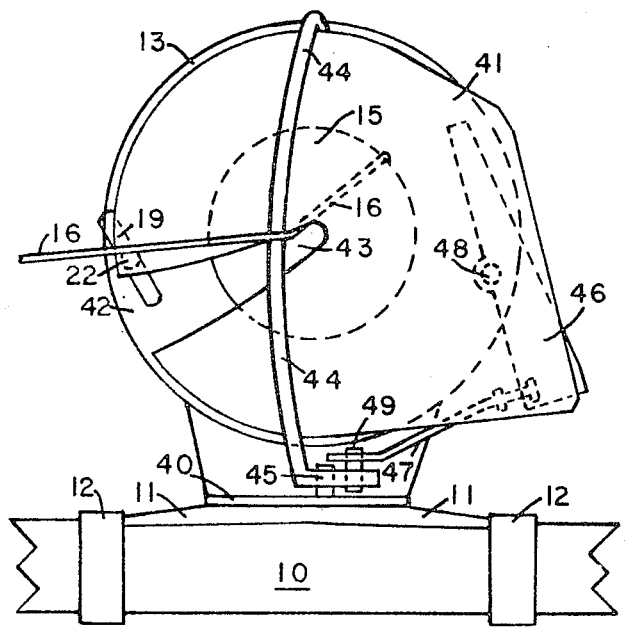
FIGURE 6 is a side elevational view of the level winding fishing reel of FIGURE 5.

The reel frame of the fishing reel of FIGURES 5 and 6 comprises a single side plate 13 and a case 41. Side plate 13 is connected to base plate 40 which is attached to reel seat plate 11 which in turn, is secured to fishing rod 10 by a pair of usual ring-type clamping members 12. Spool 15 is rotatably connected at one end to side plate 13. Case 41 substantially encloses spool 15, and is attached at one end to side plate 13. Case 41 is provided with opening 42 in front of spool 15 to allow for passage of fishing line 16 onto spool 15. Slot 43 in case 41 extends from opening 42 around the end of case 41 to a point near the axis of spool 15. In the drawings, slot 43 is shown extending from the lower portion of opening 42. Such arrangement is used when fishing line 16 is passed under the level winding means. If fishing line 16 is to be passed over the level winding means, slot 43 will extend from the upper portion of opening 42. Within opening 42 is traversing element 19 which is rotatably attached at one end to side plate 13 and at the other end to an end of opening 42 of case 41. Traversing element 19 is located in opening 42 so as to rotate on an axis AA substantially parallel to the axis of spool 15. Traversing element 19 is rotationally responsive to rotation of spool 15.

To provide for conversion of the fishing reel from drum type to spinnnig type reel, line carrier arm 44 is rotatably attached at one end by pin 45 to base plate 40. From such attachment to base plate 40, line carrier arm 44 extends outward and upward in a generally circular path to a point above the normal path of fishing line 16 which is the path of the line extending from spool 15 to the rearmost eyelet of fishing rod 10. As shown in FIGURES 5 and 6, line carrier arm 44 is rotatably connected at the upper end to the upper surface of case 41. Line carrier arm 44 may be rotatably attached to the upper surface of case 41 only and would then extend outward and downward in a circular fashion to a point just below the normal path of fishing line 16.

In operation, line carrier arm 44 is rotated from the rewind position in which it is out of contact with fishing line 16 on the side of fishing line 16 on which side plate 13 lies to a casting position in which it is in substantial alignment with the axis of spool 15. The line carrier arm is depicted in the rewind position in FIGURE 5 and in the casting position in FIGURE 6. As line carrier arm 44 is rotated from the rewind position to the casting position, fishing line 16 is carried from the normal path to a new position in which it extends from spool 15 in a direction generally parallel to the axis of spool 15. On casting, fishing line 16 is stripped off the end of spool 15 thereby providing for a longer cast since no rotation of the spool takes place. Also, backlash is substantially alleviated.

To provide for rotation of line carrier arm 44 from the rewind positon to the casting position and back, line carrier arm 44 is connected to actuating lever 46 by means of linking member 47. Actuating lever 46 is pivotally connected to case 41 through pivotal attachment to shaft 48 which is disposed generally parallel to the axis of spool 15 and is fixedly attached to case 41. Instead of being attached to case 41, shaft 48 may be attached to side plate 13 or to base plate 40 or to any other part of the fishing reel which will support the forces required to operate actuating lever 46 and allow actuating lever 46 to act with linking member 47 to cause rotation of line carrier arm 44. Actuating lever 46 may take any convenient form and is pivotally attached to shaft 48 at or near the midpoint of said lever. In operation, the fisherman produces pivotal motion in the actuating lever 46 by his thumb and thereby converts the fishing reel from drum type to spinning type and vice versa.

Figure 7:
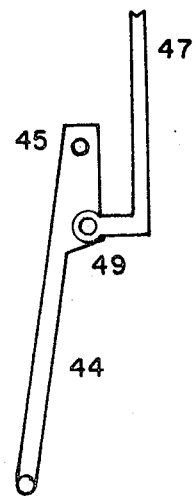
FIGURE 7 is a top view of a detail of the level winding fishing reel of FIGURES 5 and 6.

Linking member 47 generally is L-shaped as shown in FIGURE 7. The L-shaped linking member 47 may comprise a single element or may comprise two or more elements connected so as to function in the same manner as a single L-shaped member. If two or more elements are included in making up L-shaped linking member 47, one of the individual elements may be fixedly attached to line carrier arm 44 or actuating lever 46. The L-shaped linking member 47 is rotatably connected to line carrier arm 44 through a pin 49 and at its other end is connected to actuating lever 46. Thus, as actuating lever 46 is pivoted on shaft 48, linking member 47 rotationally operates line carrier arm 44 in response to the pivotal motion of actuating lever 46.

While FIGURES 5 and 6 have illustrated base plate 40 as being under spool 15 and case 41, it is particularly within the scope of the present invention that the base plate be located within the lower portion of the case 41 or in the alternative, in the upper portion of case 41. If base plate 40 is located above spool 15 in the upper portion of case 41, then linking member 47 will connect the upper end of actauting lever 46 to line carrier arm 44.

What is claimed is,

1. A fishing reel providing for level winding comprising a reel frame having a spool rotatably mounted therein, spool drive means and a level winding means rotatably connected to said reel frame and adapted for rotation through 360 degrees on an axis substantially parallel to the axis of said spool and rotatably responsive to rotation of said spool, said level winding means comprising a traversing element upon which fishing line moves in slidable contact therewith, said traversing element having two opposite substantially parallel surfaces in diagonal relationship to the axis of rotation of said traversing element, the diagonally opposite ends of said substantially parallel surfaces being substantially equidistant from said axis of rotation.

2. The fishing reel of claim 1 wherein the ends of said parallel surfaces furthest from the axis of rotation extend beyond the ends of said parallel surfaces nearest said axis of rotation.

3. The fishing reel of claim 2 wherein said traversing element has the form of a substantially flat, parallelogram shaped bar.

4. The fishing reel of claim 2 wherein said traversing element is a cylindrical bar in the shape of a Z.

5. The fishing reel of claim 1 wherein the reel frame comprises a single side plate and a case substantially enclosing said spool, said case having an opening in the front thereof in which said level winding means is disposed and a slot in the end thereof extending from said opening to a point in the end of said case near the axis of said spool, and wherein means is provided for carrying the fishing line from normal fishing position to a casting position in which said fishing line extends from said spool in a direction substantially parallel to the axis of said spool.

6. The fishing reel of claim 5 wherein the means for carrying said fishing line from normal fishing position to said casting position comprises a generally rounded line carrier arm extending outward from a base plate to which it is rotatably attached in a generally circular path across the face of said case, an actuating lever pivotally attached to said reel frame, a substantially L-shaped linking member connecting said actuating lever and said line carrier arm such that said line carrier arm is rotationally responsive to pivotal movement of said actuating lever.

References Cited

UNITED STATES PATENTS

| | | | |
|---|---|---|---|
| 2,040,777 | 5/1936 | Maynes | 242—84.41 |
| 2,652,211 | 9/1953 | Hanse | 242—84.21 |
| 2,866,291 | 12/1958 | Duell. | |
| 3,083,932 | 4/1963 | Crowley et al. | 242—157.1 |
| 3,370,806 | 2/1968 | Odom. | |

BILLY S. TAYLOR, Primary Examiner

U.S. Cl. X.R.

242—84.2, 157.1